(No Model.)
C. R. KEAR.
DEVICE FOR SCRAPING OR CLEANSING WATER OR OTHER PIPES.
No. 354,478. Patented Dec. 14, 1886.
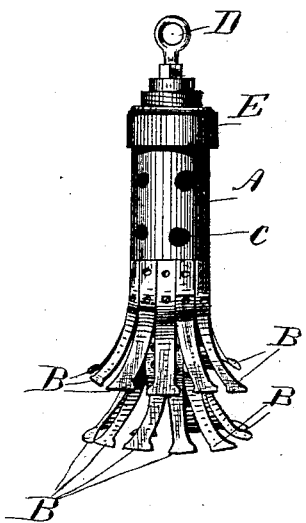
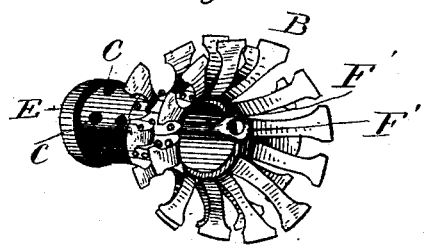
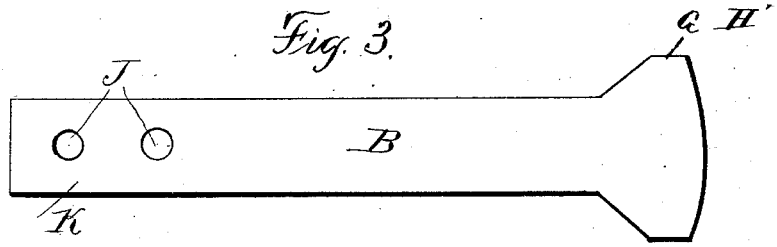
Witnesses:
Charles R. Kear Inventor.

UNITED STATES PATENT OFFICE.

CHARLES R. KEAR, OF MINERSVILLE, PENNSYLVANIA.

DEVICE FOR SCRAPING OR CLEANSING WATER OR OTHER PIPES.

SPECIFICATION forming part of Letters Patent No. 354,478, dated December 14, 1886.

Application filed August 27, 1886. Serial No. 212,021. (No model.)

*To all whom it may concern:*

Be it known that I, CHARLES R. KEAR, a citizen of the United States, residing at Minersville, Pennsylvania, have invented a new and useful Device for Scraping and Cleansing Pipes, of which the following is a specification.

My invention relates to a device for scraping and cleansing water or other pipes; and it consists of a center piece or pipe having a series of spreading steel blades bolted thereto, for the purpose of removing obstructions of any kind from the inside of pipes; and my object is to quickly and economically, by means of my device herein described, remove stones, mud, incrustations of any kind, or other foreign matter from the inside of pipes, so as to leave the flow of water or other substance passing through the same uninterrupted. I attain these objects by the mechanism illustrated in the accompanying drawings, in which—

Figure 1 is a perspective view of the device standing upright. Fig. 2 is also a perspective view of the device lying upon its side. Fig. 3 is a plan view of one of the blades of the device.

Similar letters throughout the figures designate corresponding parts.

A represents a hollow center piece, made of iron piping or other suitable material, to the lower end of which, as indicated in the drawings, is bolted or fastened the blades or scrapers B. The scrapers B are made of heavy pieces of highly-tempered spring-steel of the desired lengths, the ends of which, when bent inward, spring back to their normal position. These blades are curved outward from a point, as at I in Fig. 3, to their ends, the degree of curvature increasing to the ends of the blades, so that when the ends, as K, Fig. 3, of the blades are bolted to the center piece the ends G, Fig. 3, extend downward and outward beyond the circumference of the center piece, A. The ends of the blades (indicated by G, Fig. 3) are slightly convex with square sides, as at H in the same figure.

C are the holes or apertures in the center piece, through which the water or other substance in the pipe to be cleaned may pass. I prefer to have these openings in the center piece; but I may have it whole, or I may have the openings larger or smaller in size, or greater or less in number.

D is an eye fastened to the top or cap E, which cap is screwed or fastened on the upper end of the center piece, for the purpose of making a connection, either by chain, rope, or rod, for the purpose of drawing my invention through the pipe to be cleansed. The cap E may be a part of the center piece, and made with it in one and the same casting, if desired.

F is the shank of the eye D, extended downward through the center piece and beyond the end thereof, upon the extremity of which is formed an eye, as F', Fig. 2, or a hook to attach a similar device, if found desirable, to insure a more perfect and satisfactory operation in cleansing pipes by means of my invention.

J, in Fig. 3, are the holes through which the blades are bolted to the center piece.

It is understood that my device can be made in sizes, as occasion requires.

The operation of the device is as follows: The device is inserted in the pipe intended to be cleansed by first passing a rope, chain, or rod, which is connected to the eye of the device, through said pipe, by means whereof the scraper is drawn in until the spreading ends of the blades of the device, having a larger circumference than that of the pipe, come in contact with the end of the pipe. The ends of the blades are then compressed, the space between the blades allowing for such compression, and thus are inserted in the pipe. The blades are of such suitable length that when the scraper is introduced, being made of hard spring-steel, they press strongly against the inside of the pipe. Owing, also, to their adjustment and to the formation of their ends, the blades present an almost perfect circle bearing upon the inside of the pipe, so that when the device is drawn through the same the blades scrape the inside of the pipe thoroughly, and while they are sufficiently flexible to conform to any irregularities in the pipe, yet they are sufficiently rigid to remove incrustations or deposits of any kind—stones, mud, or other substance—accumulating therein.

Horse, steam, or other power may be used as a motive power to operate with my invention.

If it is desired to cleanse a system of pipes, as a water-main, openings are made at intervals in the line of pipe, in one of which, the water-supply being first almost turned off, is placed a ball of stout twine of the proper length, the end of which is fastened to a rope or rod, which in turn is attached to the eye of my invention. This ball of twine is allowed to float down through the pipe, feeding itself out as it progresses until it reaches the next opening, where it is secured. By means of the twine the rope is pulled through, which in turn is the means of drawing the scraper through the pipe. This operation is repeated from time to time until the entire main is cleared.

By my invention a greater saving of time and a more thorough operation is effected than by any known method of cleansing pipes, and its use avoids the necessity of renewing pipes (thereby effecting great economy) the insides of which have become more or less clogged with deposits of iron or other substance undesirable.

I am aware that a patent was granted to Jan Van Slooten, Caleb S. Hunt, and William McCulloch, July 5, 1870, No. 105,015, for improvements in pipe-cleansing apparatus, in which a piston made of a series of disks which are armed with bristles, wires, or springs, and having on its rear face a stop-valve, is by hydraulic pressure forced through the pipe to be operated upon after the pipe had been properly capped, and all branch pipes have been cut off by stop cocks. My device is different in form, design, appearance, construction, and mode of operation. My center piece is not a piston made of disks, but is made hollow to insure lightness, and of metal, to insure strength and durability. The side of the center piece is perforated to enable the scraped-off accumulations to pass behind the machine so as not to retard its progress. My scrapers are steel springs of a studied shape, sharpened at their ends, and are not attached to disks but are bolted to the center piece.

I am also aware that a patent was granted to Edward H. Keating, July 29, 1884, No. 302,634, for improvements in apparatus for removing incrustations from water-pipes, in which springs perforated midway and bent back are slipped or threaded on a center rod or backbone by means of the aperture in the springs, on the ends of which are bolted knives or scrapers. My device is different in form, construction, and design. It cannot be operated by being forced or pushed by running water, or by water furnished from the fountain-head or reservoir, but is designed to be drawn or pulled through the pipe by horse-power, although other draft-power is practicable, as circumstances may require. My center piece is preferably made of ordinary cast-iron piping, with a view to economy, has a comparatively large circumference, this to reduce the length of the springs and thus make them more rigid, and is perforated for the purpose hereinbefore stated. I do not employ a metal tube surrounding the center piece, nor are my knives or scrapers independent of the springs, but consist merely of the springs sharpened at their ends. My knives, formed as described and shown, bear upon the pipe in such manner as to form a complete circle, so that no part of the pipe inside escapes from the scrapers when in motion, which does away with the necessity of performing the operation again. My springs are peculiar in shape and construction, and are separately bolted to the center piece, and in no way can be likened to his. Besides, as compared with Mr. Keating's device, it can be readily seen that my invention is more simple, more durable, stronger, and more economical.

Having sufficiently described my invention, what I claim, and desire to secure by Letters Patent, is—

In a device for scraping or cleansing water or other pipes, a perforated hollow metal center piece, with a top or cap having an eye, the shank of which extends downward through said center piece and beyond the same, terminating in a hook or eye, and having bolted thereto blades of highly-tempered spring-steel or other metal, curving downward and outward, with the ends thereof extending beyond the circumference of the said center piece, substantially as set forth and described.

In witness that I claim the foregoing I hereunto set my hand this 12th day of August, A. D. 1886.

CHARLES R. KEAR.

Witnesses:
ALBT. ROEHRIG,
GEORGE W. ELLIS.